Sept. 26, 1967 R. A. BOYLE 3,344,417

DIGITAL MAGNETIC RECORDING VERIFICATION

Filed May 25, 1964

INVENTOR.
ROBERT A. BOYLE
BY Arthur H. Swanson
ATTORNEY.

United States Patent Office 3,344,417

Patented Sept. 26, 1967

3,344,417 DIGITAL MAGNETIC RECORDING VERIFICATION

Robert Anthony Boyle, Littleton, Colo., assignor to Honeywell Inc., Minneapolis, Minn., a corporation of Delaware Filed May 25, 1964, Ser. No. 369,803
4 Claims. (Cl. 340—174.1)

ABSTRACT OF THE DISCLOSURE

A digital recording checking circuit for verifying the recording of a bit of digital information by a center-tapped magnetic head winding. A diode circuit is connected to the magnetic head and senses an echo signal from the previously recorded bit of digital information as a new bit is recorded. The echo signal is fed through an OR gate into a multivibrator whose output is used to indicate a proper recording process.

This invention relates to recording apparatus. More specifically, the present invention relates to magnetic recording apparatus.

An object of the present invention is to provide an improved magnetic recording apparatus for digital data.

The magnetic recording of digital data has previously been successfully accomplished through the use of techniques which, in general, are adaptations of conventional analog signal recording methods. Existing digital recorders provide means for minimizing inefficiencies inherent in these analog methods when applied to the recording of asynchronous digital data. However, for many important applications, it is feasible to accomplish the recording operation through the use of techniques which, for digital purposes, are simpler, more reliable and more efficient. One of these techniques is the fast start-stop digital transport which provides the capability to accelerate the magnetic tape to some predetermined speed within milliseconds and to stop the tape from a high speed within a similar time period. The amount of tape which is wasted during these periods of acceleration and deceleration is generally limited to some fraction of an inch for a start-stop cycle. However, as is easily shown, the number of such cycles necessary to effect a recording of any given amount of asynchronous data is dependent upon the independent buffer storage space available for the incoming digital data. For most applications, it is possible to achieve a reasonable compromise between inter-record gaps and buffer storage space. On the other hand, if a direct control over spacing accuracy could be employed, the necessity to provide either the buffer storage or the gaps could be eliminated. Such a direct control is achieved in the incremental digital recorder using direct stepping control of the capstan. Unlike the conventional recorder, there is no fixed "time" either betwen recorder digital bits or between any two points along the tape. Thus, it is entirely possible to reproduce a series of equally spaced digital bits which, during recording, were separated by widely varying amounts of time. This incremental digital recording technique has been found to present a problem when the necessity arises to provide continuous checking of the recorded digital data. The problem is occasioned by the limited motion of the recording tape which motion is limited to a few milliseconds immediately following the recording of each digital data line. Conventional error checking methods which depend upon the arrival of recorded data at a playback head located a fixed distance, and therefore a fixed time "downstream" from the recording head are of little value in the incremental digital recording apparatus. Whereas the benefits of incremental recording accrue because tape motion is independent of time, this feature prevents the use of conventional error checking.

The present invention incorporates a unique "echo checking" structure in an incremental recorder to verify the recording operation in response to an applied input signal. This checking arrangement is effective to provide a continuous check of the digital recording operation by utilizing signals generated during the recording of the input signals.

Another object of the present invention is to provide an improved digital data incremental recording apparatus having means for checking the recording operation.

Still another object of the present invention is to provide a digital recording checking means using signals generated during the recording operation.

A further object of the present invention is to provide a continuously operating digital recording checking means for use with an incremental digital recording apparatus.

A still further object of the present invention is to provide an improved incremental digital recording checking apparatus, as set forth herein, having a simple operation and construction.

In accomplishing these and other objects, there has been provided, in accordance with the present invention, a digital recording checking means for continuously monitoring the recording operation of an incremental digital recorder comprising a multivibrator arranged to produce an output signal indicative of the proper operation of the recording process. The multivibrator is triggered by a control signal derived from the operation of the magnetic recording head. The recording head is arranged as a center-tapped winding with half the winding being utilized for each flux reversal corresponding to a digital input signal. The signals for energizing the multivibrator are the signals induced as echo signals from a previously active half of the head winding into a currently active half of the head winding. A diode OR gate arrangement is arranged to selectively connect the induced signals to the input circuit of the multivibrator as trigger signals therefor. The output signal from the multivibrator may be used with appropriate logic circuits to indicate the correct execution of the recording process.

A better understanding of the present invention may be had from the following detailed description when read in connection with the accompanying drawings, in which.

Figures 1, 2:
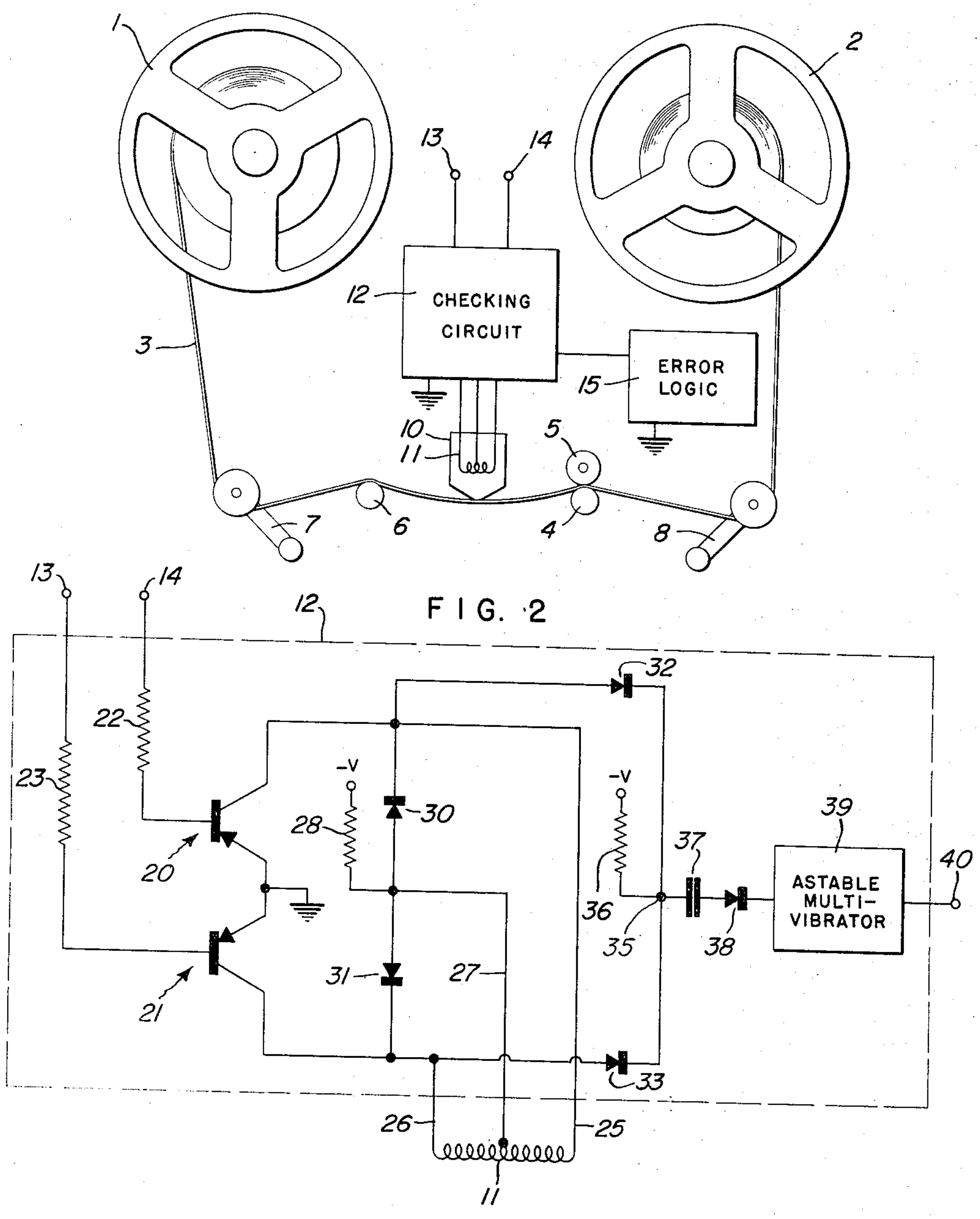
FIG. 1 is a pictorial representation of an incremental digital recorder apparatus embodying the present invention.
FIG. 2 is a schematic representation of a checking circuit for use with the recorder apparatus shown in FIG. 1.

Referring to FIG. 1 in more detail, there is shown an incremental recorder apparatus comprising a first storage reel 1 and a second storage reel 2. A magnetic recording tape 3 is driven between the reels 1 and 2 by a capstan 4 and pinch roller 5. The capstan 4 is driven by an incremental steping means, not shown, to provide a stepwise motion of the tape 3. The tape 3 may be supported on a guide roller 6 and tensioned by a pair of tension arms 7 and 8. The storage reels 1 and 2 may be used as a supply reel 1 and a take-up reel 2 whereby the tape 3 is incrementally transferred from supply reel 1 to the take-up reel 2.

A magnetic recording head 10 is arranged to record digital bit signals on the tape 3. The head 10 includes a center-tapped winding 11 which is operative to develop a magnetic field for selectively magnetizing desired areas of the recording tape 3. The digital data signals are supplied to the recording head winding 11 by a checking circuit 12 from a pair of separate input terminals 13 and 14. The checking circuit 12 is also effective to provide a recording process operation signal to an error logic means 15. The logic means 15 may be any suitable device responsive to the operation signal to provide an error indication and/or a control signal to affect related devices; e.g., the incremental transport control system.

In FIG. 2, there is shown a schematic illustration of a checking circuit 12 suitable for use with the transport apparatus shown in FIG. 1. This circuit includes a pair of transistors 20 and 21 having their emitter electrodes connected to a ground connection either directly or through separate emitter resistors. The base electrode of a first transistor 20 is connected through a resistor 22 to the input terminal 14. Similarly, the base electrode of second transistor 21 is connected through a resistor 23 to the input terminal 13. The collector electrode of the first transistor 20 is connected by line 25 to one end of the head winding 11. The collector electrode of the second transistor is connected by a line 26 to the other end of the winding 11. The center-tap of the winding 11 is connected by a line 27 through a resistor 28 to a source of potential —V.

A first diode 30 is connected between line 25 and the line 27 with its cathode connected to line 25. Similarly, a second diode 31 is connected between line 26 and line 27 with its cathode connected to line 26. This connection of diode 30 and 31 is effective to position them across respective halves of the winding 11. Line 25 is also connected to the anode of a third diode 32. Line 26 is connected to the anode of a fourth diode 33. The cathodes of diodes 32 and 33 are connected to a junction point 35. The point 35 is connected through a resistor 36 to a source of potential —V and through a capacitor 37 to the anode of a fifth diode 38. The cathode of the fifth diode 38 is connected to the input circuit of an astable multivibrator 39. The output signal from the multivibrator 39 is applied along line 40 to the error logic means 15.

In operation, the present invention is effective to continuously monitor the recording signal to provide a check on the operation of the digital recording process. The astable multivibrator 39 is effective to produce an output signal when it is triggered by an input signal applied thereto. This input signal is derived from an OR gate configuration comprising the diodes 32 and 33. Capacitor 37 is used to couple the signal from this OR gate to blocking diode 38. Diode 38 is provided to restrict the input signal to the proper polarity for triggering the multivibrator 39. The output signal from the multivibrator 39 is an indication of the operation of the recording process and is applied along line 40 to the error logic circuit 15 which is arranged to produce a desired error indication; e.g., illumination of an alarm light, upon an improper recording operation. Further, it is to be noted that this output signal may be combined with other signals indicative of the operation of the incremental transport. For example, a signal may be obtained which is indicative of tape motion to provide a further error indication if the tape has failed to move during the prior incremental recording cycles.

The input signals for the OR gate are derived from the recording operation. Using the conventional non-return to zero digital recording, either input terminal 13 or 14 has an input signal applied thereto. This input signal is switched from one terminal to the other when it is desired to record a one. Thus, one of the input terminals is always energized, and a current is always present in half of the winding 11 in the recording head 10. The input signals applied to the input terminals 13 and 14 may be derived from opposite sides of a driving flip-flop. This arrangement would produce a switching action with respect to the current in the head winding 11 when the flip-flop is triggered to an opposite state to change the digital bit to be recorded.

Assume in an initial state, that transistor 20 is held in a conducting state by the driving flip-flop while transistor 21 is in a non-conducting state. Under these conditions, a current will flow through the half of the winding 11 connected between lines 25 and 27. This current is the collector current of transistor 20 as determined by resistor 28, source —V, the input signal applied to the base of transistor 20, the impedance of the affected half of winding 11 and any emitter resistor which may be used to balance out any differences in the impedance between the halves of the winding 11. Under this condition, line 26 will be at substantially the same potential as line 27.

A trigger signal is applied to the multivibrator 39 when a positive polarity pulse appears at the anode of either diode 32 or 33. This pulse will bias the respective diode into conduction and develop a trigger signal for the multivibrator 39. The trigger signal is produced when the input signal is switched by the driving flip-flop connected to input terminals 13 and 14. At the instant of flip-flop reversal, transistor 21 is turned on, and transistor 20 is turned off. This is effective to abruptly terminate the aforesaid existing current in the winding 11. Collapse of the magnetic field in the half of the winding between lines 25 and 27 will generate a negative polarity voltage at line 25. This voltage will be limited by concurrent conduction of diode 30 and the instantaneous voltage on line 26. The conduction of diode 30 provides a low resistance path for the collapsing field to produce an induced current through the half of the winding 11 between lines 25 and 27. This induced current pulse, or echo signal, is transmitted by transformer action to the half of the winding between lines 26 and 27 to appear as a positive polarity pulse on line 26.

This positive pulse is coupled through diode 33, capacitor 37 and diode 38 to the input circuit of multivibrator 39. The multivibrator 39 is, then, effective to produce a signal on output line 40 for application to the error logic means 15. The presence of this signal from the multivibrator 39 is an effective check on the operation of the data input circuits and the operation of the magnetic recording head. The further operation of the checking circuit for the next current reversal, or switch between input terminals 13 and 14 is substantially the same as that described above with the interchange of transistor 21 for transistor 20 and diodes 31 and 33 for diodes 30 and 32, respectively. Thus, a switch of the input signal between the input terminals 13 and 14 is effective to produce an output signal from the multivibrator 39 as a continuous check on the operation of the recording operation.

Accordingly, it may be seen that there has been provided, in accordance with the present invention, a recording operation checking circuit for an incremental digital recorder utilizing signals generated by the recording head during the recording process to provide a continuous check on the operation of the recording head.

What is claimed is:

1. A digital recording checking circuit comprising echo signal means responsive to the collapse of a magnetic record field in either half of a center-tapped magnetic recording head winding and signal gating means connected to said echo signal means to produce an output signal representative of said collapse of a magnetic field in either half of a center-tapped head winding.

2. A digital recording checking circuit comprising echo signal means responsive to the collapse of a magnetic field in either half of a center-tapped magnetic head winding, said means including a pair of diodes connected across respective halves of said winding and poled to allow a current resulting from a field collapse to flow therethrough, and signal gating means connected to said echo signal means to produce an output signal respresentative of said collapse of a magnetic field.

3. A digital recording checking circuit as set forth in claim 2 wherein said gating means includes a second pair of diodes arranged as an OR gate, and an astable multivibrator, said OR gate being arranged to apply a signal induced in a half of said center-tapped head winding by the collapse of a magnetic field in the other half of said head winding.

4. A digital recording checking circuit comprising a pair of amplifying circuits operative to apply a selective input signal to respective halves of a center-tapped magnetic head winding, a first diode arranged to be connected across one half of said center-tapped winding, a second diode arranged to be connected across the other half of said winding, said first diode and said second diode being poled to allow a current flow therethrough resulting from the collapse of a magnetic field in a respective half of said winding, an OR gate including a third diode arranged to be connected to one side of said head winding and a fourth diode arranged to be connected to the other side of said winding, said third and fourth diodes being poled to pass induced signals from respective halves of said winding resulting from a collapse of a magnetic field in one of said halves of said head winding, and an astable multivibrator having an input circuit connected to receive an output signal from said OR gate and triggered by said output signal to provide a signal representative of the operation of said magnetic recording head.

References Cited

UNITED STATES PATENTS

| | | | |
|---|---|---|---|
| 2,789,026 | 4/1957 | Nordyke ---------- | 340—174.1 |
| 3,248,717 | 4/1966 | Mayhew ---------- | 340—174.1 |

BERNARD KONICK, *Primary Examiner.*

A. I. NEUSTADT, *Assistant Examiner.*